United States Patent [19]
Mardon et al.

[11] Patent Number: 5,373,541
[45] Date of Patent: Dec. 13, 1994

[54] NUCLEAR FUEL ROD AND METHOD OF MANUFACTURING THE CLADDING OF SUCH A ROD

[75] Inventors: Jean P. Mardon, Caluire; Jean Senevat, St. Brevin les Pins, both of France

[73] Assignees: Framatome, Courbevoie; Compagnie Generale des Matieres Nucléaires, Velizy Villacoublay; Zircotube, Paris la Defense, all of France

[21] Appl. No.: 5,433

[22] Filed: Jan. 19, 1993

[30] Foreign Application Priority Data

Jan. 17, 1992 [FR] France ............... 92 00486

[51] Int. Cl.$^5$ ............................... G21C 3/06
[52] U.S. Cl. ............................ 376/457; 376/416
[58] Field of Search ............ 376/260, 261, 416, 457, 376/417; 148/672; 976/DIG. 44, DIG. 43

[56] References Cited

U.S. PATENT DOCUMENTS

| | | | |
|---|---|---|---|
| 3,963,534 | 6/1976 | Frenkel et al. | 148/133 |
| 4,675,153 | 6/1987 | Boyle et al. | 376/416 |
| 4,717,534 | 1/1988 | Morita | 376/419 |
| 4,735,768 | 4/1988 | Stehle et al. | 376/417 |
| 4,963,316 | 10/1990 | Stehle et al. | 376/416 |
| 4,992,240 | 2/1991 | Komatsu et al. | 420/422 |
| 5,023,048 | 6/1991 | Mardon et al. | 376/416 |
| 5,024,809 | 6/1991 | Taylor | 376/417 |

FOREIGN PATENT DOCUMENTS

| | | |
|---|---|---|
| 1168769 | 6/1984 | Canada . |
| 0195155 | 9/1986 | European Pat. Off. . |
| 0380381 | 8/1990 | European Pat. Off. . |
| 0415134 | 3/1991 | European Pat. Off. . |

*Primary Examiner*—Donald P. Walsh
*Assistant Examiner*—Meena Chelliah
*Attorney, Agent, or Firm*—Pollock, Vande Sande & Priddy

[57] ABSTRACT

A nuclear fuel rod cladding for a water moderated and nuclear reactor comprises an inner portion of Zircaloy 4 and an outer portion of a zirconium-based alloy which contains by weight, besides zirconium and unavoidable impurities:

0.35% to 0.65% tin
0.18% to 0.25% iron
0.07% to 0.13% chromium, and
0.19% to 0.23% oxygen, with the sum of the iron, chromium, tin, and oxygen contents being less than 1.26% by weight. It may alternatively or additionally comprise 0.80% to 1.20% by weight niobium and then the oxygen content is in the range 0.10% to 0.16% by weight. The thickness of the outer layer is 10% to 25% of the total thickness of the cladding. In a modification, up to 0.5% of iron, chromium, niobium is replaced by an equivalent content of vanadium.

10 Claims, 1 Drawing Sheet

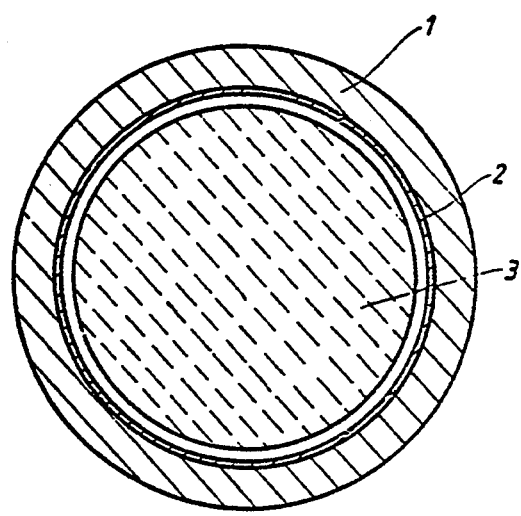

NUCLEAR FUEL ROD AND METHOD OF MANUFACTURING THE CLADDING OF SUCH A ROD

BACKGROUND OF THE INVENTION

The present invention relates to fuel rods for use in fuel assemblies for a water cooled and moderated nuclear reactor, in particular in assemblies for a pressurized water reactor.

These rods are made of fuel pellets enclosed in cladding of an alloy having low neutron absorption. The cladding must satisfy numerous conditions, some of which are difficult to reconcile. It must remain watertight, it must conserve its mechanical properties under irradiation at high temperature, and its amount of creep must be low. It must resist corrosion by the aqueous medium in which it is immersed. It must have little interaction with the fuel contained inside the cladding.

Until now, cladding has been made above all from a zirconium based alloy known as "Zircaloy 4" which contains:

1.20% to 1.70% tin;
0.18% to 0.24% iron;
0.07% to 0.13% chromium;

the total iron plus chromium content being in the range 0.28% to 0.37%.

Standards concerning "Zircaloy 4", also known under the reference UNSR 60804, place a limit on the content of elements other than zirconium and those specified above, except with respect to oxygen, where it is merely stated that the oxygen content must be specified in each case. The usual oxygen content of "Zircaloy 4" does not exceed 0.12%, and is generally much less.

While the mechanical strength of "Zircaloy 4" claddings has been found satisfactory, it has been observed that corrosion by the surrounding high temperature aqueous medium considerably reduces the length of time they can be kept in a reactor. Proposals have already been made to avoid this defect by using "duplex" or "triplex" claddings (see FR-A-1 547 960; EP-A-212 351; U.S. Pat. No. 4,649,023) which have at least an inner layer of "Zircaloy 4", or of a similar alloy, and an outer layer which is considerably thinner than the inner layer and which is made of a zirconium-based alloy that withstands corrosion better than "Zircaloy 4".

In particular, cladding has been proposed that has an inner layer of "Zircaloy 4" and an outer layer made of a zirconium-based alloy having a reduced or zero tin content, but containing additional elements such as niobium, vanadium and nickel, which improve corrosion resistance.

It has long been known (e.g., U.S. Pat. No. 4,717,534) that Zr—Nb alloys having about 2.5% niobium have good corrosion resistance in a high temperature aqueous medium.

The composition of the alloy constituting the outer layer must be such that the cladding can be obtained by co-rolling or co-extrusion, with a high thickness reduction ratio at each manufacturing step. In addition, the presence of the outer layer must not significantly degrade the mechanical characteristics of the cladding as a whole. Unfortunately, to a first approximation, the mechanical properties of the cladding is the result of summing the properties of both layers, weighted by a factor representing the fraction of the total thickness applicable to each layer. It is well-known that ordinary zirconium-niobium alloys, having a very low oxygen content, have mechanical properties that are greatly inferior to those of Zircaloys.

SUMMARY OF THE INVENTION

An object of the present invention is to provide cladding for a nuclear fuel rod where the cladding includes at least one inner layer of "Zircaloy 4" and an outer layer that is thinner than the inner layer, which better fulfils practical requirements than previously known cladding, in particular by having considerably increased resistance to corrosion in the ambient aqueous medium while conserving mechanical characteristics that are quite comparable to those of cladding of solid "Zircaloy 4".

To this end, the invention provides a nuclear fuel rod whose cladding comprises at least an inner portion of "Zircaloy 4" and an outer portion of a zirconium-based alloy that contains by weight, besides zirconium and unavoidable impurities:

(a)
  0.35% to 0.65% tin;
  0.18% to 0.25% iron;
  0.07 to 0.13% chromium, and
  0.19% to 0.23% oxygen with the sum of the iron, chromium, tin, and oxygen content being less than 1.26%;
  up to 200 ppm silicon
(b)
  and/or 0.80% to 1.20% niobium, the oxygen content then being in range of 0.10% to 0.16% by weight,
  the thickness of the outer layer being in the range of 10% to 25% of the total thickness of the cladding.

In a modification, a 0% to 0.05% content of iron, chromium or niobium is replaced by an equivalent content of vanadium.

When the outer layer contains tin and does not have an appreciable niobium content, an oxygen content that is much higher than in ordinary Zircaloy 2, 3 and 4 type alloys makes it possible to obtain mechanical characteristics that come close to those of Zircaloy 4, providing the cladding is in relaxed condition (stress-relieved).

When the outer layer has only one metal additive (ignoring unavoidable impurities) constituted by niobium, then the alloy in relaxed condition, even when its oxygen content is high, suffers from very poor resistance to hot creep. This drawback is avoided by having an alloy which is simultaneously doped with oxygen and by subjecting the cladding to a final recrystallization heat treatment.

The invention also provides a method of manufacturing cladding suitable for use in a rod of the type defined above.

In order to obtain a duplex tube for a fuel rod in accordance with the present invention, a composite billet is made having an inner portion of "Zircaloy 4", and in particular having a tin content in the low end of the range specified by the standard, and an outer portion made of a zirconium—niobium—oxygen alloy or of a zirconium-based alloy containing tin, iron, chromium and oxygen. These two billets are assembled together by welding their ends.

The billets obtained in this way for the two types of alloy are hot extruded, typically at 650° C. It is during this coextrusion operation that metallurgical bonding is obtained between the two zirconium alloys. The duplex tube blanks obtained in this way are transformed into finished duplex tubes by a succession of thermomechanical cycles. Typical dimensions of finished duplex-tubes are 9.50 mm outside diameter and 0.625 mm thickness, or 10.75 mm and 0.725 mm, with an outer layer of zirconium-based alloy containing niobium and oxygen (or iron, chromium, tin, oxygen) having a thickness in the range of about 80 μm to about 140 μm.

Cold rolling steps, typically in a pilgrim step machine, of the thermo-metallurgical sequence are identical for both alloys studied, for all passes, in terms of cross-section reduction ratio and of Q factor (ratio between variation in thickness and variation in diameter), even at high deformation ratios. Transformation takes place without difficulty, and without creating crack-type defects. However, intermediate recrystallization annealing operations and the final annealing operation are adapted to each of the two alloys.

For the zirconium-tin-iron-chromium-oxygen alloy, intermediate recrystallization annealing takes place in the range of 700° C. to 750° C. If there are five steps, the first two are advantageously at about 735° C. and the last two at about 700° C., while final annealing is performed at about 485° C.

As for the zirconium-niobium-oxygen alloy, the intermediate recrystallization annealing operations between rolling passes are performed first at about 580° C.±15° C. in order to avoid corrosion during the respective rolling phases. The last three annealing operations may be carried out at 700° C.±15° C. for Zircaloy 4 to have satisfactory resistance in a PWR. The final annealing operation is performed at about 580° C.

For a finished duplex-tube, the thermal mechanical transformation sequences selected for the two alloys give rise to sizes and distributions of intermetallic precipitates that are optimal mainly with respect to generalized corrosion, namely, precipitation that is fine (precipitate diameter of about 50 nm) and uniform for the zirconium alloy containing niobium and oxygen, and precipitation that is uniform and of sufficient size (intermetallic particle diameter greater than 0.18 μm) for the zirconium-tin-iron-chromium- and oxygen-alloy.

BRIEF DESCRIPTION OF THE DRAWING

The single FIGURE is a cross-sectional view of a fuel rod according to the invention.

DESCRIPTION OF PREFERRED EMBODIMENTS

The drawing FIGURE shows a cross-section of a fuel rod with heavy fuel pellets 3 in a cladding having an inner layer 2 and an outer layer 1.

Some test results showing the advantages of cladding compositions in accordance with the invention will now be given.

Compositions Containing Tin, with a Low Tin Content and a High Oxygen Content

Tests were first performed to determine the consequences of reducing the tin content as compared with those in a conventional Zircaloy 4 having an oxygen content of 0.12%, and in alloys for making the outer layer having a low tin content for reducing corrosion in a high temperature aqueous medium.

The greatest differences relate to resistance to thermal creep under conditions representative of those found in a reactor at 400° C. over a period of 240 hours and under a stress of 130 MPa.

Diameter deformation was then as follows:

alloy A (Zircaloy 4 having 1.5% tin and 0.12% oxygen): 1.3%
alloy B (Zircaloy 4 having 1.3% tin and 0.12% oxygen): 1.5%
alloy C (alloy having only 0.5% tin and 0.12% oxygen): 3.6%
alloy D (alloy having 0.5% tin and 0.19 to 0.2% oxygen): 1.7% to 1.8%.

These results were obtained with an alloy in stress-relieved condition. It can be seen that the substantial increase in oxygen content makes it possible, with an alloy having a very low tin content, to obtain resistance to thermal creep and thus resistance under radiation almost equivalent to that of a Zircaloy 4. Creep values thus obtained are compatible with the design requirements of a fuel rod. In addition, creep tests under conditions representative of LOCA conditions show, in particular for certain temperatures (of higher end range $\alpha$, ranges $\alpha+\beta$ and $\beta$) that the high temperature creep behavior of alloy D doped with $O_2$ is comparable to or even better than that of Zircaloy 4 alloys A and B in terms of fracture time and of ductility.

Tests for measuring the yield strength under tractive force and in bursting, mostly at ambient temperature, have also shown a clear deterioration relative to standard Zircaloy 4 when the tin content is reduced to 0.5% and in the absence of an increase in the oxygen content. These tests have shown that substantially the same resiliency limit is obtained as with Zircaloy 4 containing 1.5% tin when the relaxed alloy contains 0.19% to 0.20% oxygen.

These favorable results are obtained with an alloy that is stress-relieved: If on the other hand the alloy is recrystallized, then the deterioration in the ability to withstand thermal creep caused a decrease in the tin content remains, even with a high oxygen content.

However, it may be preferred, in certain cases, when it is essential to obtain long term stability in a reactor and to provide the inner layer with particularly high resistance to corrosion, to recrystalize the entire cladding by a final thermal treatment. Then that treatment may be carried out at 780° C.±25° C.

Composition Further Comprising Silicon

An amount of silicon of up to 200 ppm may be added to improve resistance to generalized corrosion, while it has no substantial effect on the nodular corrosion (which is present in BWRs rather than PWRs).

Compositions Containing Niobium, at Low Niobium Content and with Different Oxygen Contents For an outer layer containing tin and not having an appreciable niobium content, an oxygen content that is much higher than that of usual Zircaloy 2, 3 and 4 type alloys makes it possible to obtain mechanical characteristics that are close to those of Zircaloy 4, in particular when the alloy is in a relaxed state.

When the outer layer has niobium as its only metal additive (apart from inevitable impurities), then the alloy in relaxed state, even when it has a high oxygen content, presents very poor resistance to thermal creep. This drawback is avoided by using an alloy that is doped with oxygen, and by simultaneously subjecting the cladding to final heat treatment for recrystallization purposes. In addition, for this ZrNb alloy, recrystallizing and adding oxygen also make it possible to considerably improve resistance to corrosion under stress in the presence of iodine, to improve the resistance limit to fatigue, to reinforce its conventional mechanical characteristics, and to return to a resistance to LOCA (loss of primary coolant accident) that is as good as that of Zircaloy 4 in the recrystallized state.

Comparison Between Zircaloy 4 Alloys and Alloys Containing Niobium

The same comparison as above was performed between (a) alloys A and B and (b), the following niobium alloys E and F:
- alloy E: 1% niobium and 0.08% to 0.10% oxygen
- alloy F: 1% niobium and 0.125% oxygen.

The alloys containing only 1% niobium, even when heavily doped with oxygen, have mechanical characteristics when stress-releaved they are too unfavorable, in particular with respect to creep, for it to be possible to envisage using them.

In contrast, tests performed on alloys in the recrystallized metallurgical state have shown advantage of oxygen-doped alloy F.

The following results are obtained for thermal creep at 400° C. over a period of 240 h under 130 MPa:
- recrystallized alloy A: 0.5% to 0.6%
- recrystallized alloy B: 1%
- recrystallized alloy E: 0.60%
- recrystallized alloy F: 0.25% to 0.30%.

In addition, measuring yield strength has shown that the degradation in mechanical characteristics on passing from alloy A or B to alloy E is almost totally compensated with alloy F.

The results of a comparison between solid cladding made of alloy A or B, i.e., Zircaloy 4, and duplex cladding having an inner layer occupying 80% of its thickness and an outer layer occupying 20% of its thickness, the inner layer being made of alloy A or B and the outer layer of alloy C, D or F, will now be given.

The results obtained were as follows, for the recrystallized state:
under thermal creep testing at 400° C., under 130 MPa for a period of 240 hours, typical diametral deformation was as follows:
- solid alloy A: 0.30-0.40%
- solid alloy B: 1%
- Duplex B/C:
- Duplex B/D: 1.1%-1.25%
- Duplex A/F: 0.75%-0.85%.

During bursting tests at 400° C., the $R_{p0.2}$ elastic limits are as follows:
- solid alloy A: 215 MPa
- solid alloy B: 182 MPa
- Duplex B/C: 176 MPa
- Duplex B/D: 194 MPa
- Duplex A/F: 187 MPa.

An analysis of these results shows that:
(a) oxygen doping of the D-type alloy constituting the outer layer of the B/D duplex tubes makes it possible
to improve resistance to hot creep and to improve mechanical characteristics as compared with the B/C duplex that has little oxygen; and
to bring these properties up to the same level as those obtained using solid alloy B.
(b) the high oxygen content in alloy F of the A/F duplex
gives rise to increased resistance to creep and improved mechanical characteristics; and
makes it possible to obtain properties that are close to or better than those of solid alloy B.

In addition, selecting the recrystallized state in combination with oxygen doping for the B/D duplex and the A/F duplex also makes it possible to obtain improved corrosion resistance under stress and in the presence of iodine, to improve as regards growth under irradiation and to obtain a phase texture of the crystal lattice that is more radial.

As a general rule, an amount of dopeing oxygen improves mechanical resistance and particularly yield strength. Recrystallization of the inner layer, when caused by the final thermal treatment, increases resistance to corrosion under stress by iodine from the fuel. Recrystallization of the entire cladding, when caused by the final treatment, increases overall resistance to hot creep of the cladding.

We claim:

1. Fuel rod for a water-cooled and moderated nuclear reactor, comprising fuel pellets enclosed in a cladding having:
   an inner layer of a zirconium-based alloy which contains by weight:
   1.20% to 1.70% tin
   0.18% to 0.24% iron
   0.07% to 0.13% chromium,
   the sum of the iron and chromium contents being comprised between 0.28% and 0.37%; and
   an outer layer of a zirconium-based alloy containing by weight, beside zirconium and unavoidable impurities:
   0.35% to 0.65% tin
   0.18% to 0.25% iron
   0.07% to 0.13% chromium, and
   0.19% to 0.23% oxygen,
   with the sum of the iron, chromium, tin and oxygen contents being less than 1.26% by weight,
   and/or 0.80% to 1.20% by weight of niobium,
   the oxygen content being then comprised between 0.10% and 0.16% by weight,
   the thickness of the outer layer being comprised between 10% and 25% of the total thickness of the cladding.

2. Fuel rod for a water-cooled and moderated nuclear reactor, comprising fuel pellets enclosed in a stress-relieved cladding having an inner layer of a zirconium-based alloy which contains by weight:
   1.20% to 1.70% tin
   0.18% to 0.24% iron
   0.07% to 0.13% chromium,
   the sum of the iron and chromium contents being comprised between 0.28% and 0.37%,
   and having an outer layer of a zirconium-based alloy containing by weight, beside zirconium and unavoidable impurities:
   0.35% to 0.65% tin
   0.18% to 0.25% iron
   0.07% to 0.13% chromium, and
   0.19% to 0.23% oxygen,
   up to 200 ppm silicon,
   with the sum of the iron, chromium, tin, and oxygen contents being less than 1.26% by weight.

3. Fuel rod for a water-cooled and moderated nuclear reactor, comprising fuel pellets enclosed in recrystallized cladding having an inner layer of a zirconium-based alloy which contains:
   1.20% to 1.70% of tin
   0.18% to 0.24% of iron
   0.07% to 0.13% of chromium,
   the sum of the iron and chromium content being comprised between 0.28% and 0.37%, and having an outer layer of a zirconium-based alloy containing by weight, beside zirconium and unavoidable impurities, 0.80% to 1.20% niobium and 0.10% to 0.16% oxygen.

4. Rod according to claim 2, wherein an amount of up to 0.05% of Fe or Cr in the iron content of the outer layer is replaced with an equivalent amount of vanadium.

5. Method for manufacturing a cladding for a nuclear fuel element, said cladding having an inner layer of Zircaloy-4 which contains:

1.20% to 1.70% tin
0.18% to 0.24% iron
0.07% to 0.13% chromium, the sum of the iron and chromium content being comprised between 0.28% and 0.37%, and having an outer layer of a zirconium-based alloy containing by weight, beside zirconium and unavoidable impurities:

0.35% to 0.65% tin
0.18% to 0.25% iron
0.07 to 0.13% chromium, and
0.19% to 0.23% oxygen,
up to 200 ppm silicon with the sum of the iron, chromium, tin and oxygen content being less than 1.26% by weight, said method comprising the steps of:

(a) forming a composite billet having an inner layer of Zircaloy 4 and an external blank consisting of said zirconium-based alloy by end welding; extruding the billet at about 650° C. for bonding said inner layer and said external blank and forming a duplex tube blank;

(b) transforming the duplex tube blank so obtained by a succession of thermo-mechanical cycles; and (c) carrying out a final step of thermally stress-relieving said cladding.

6. Method according to claim 5, wherein the final annealing is performed at about 485° C.

7. Method according to claim 5, wherein the cycles comprise successive annealings at about 735° C. and 700° C.

8. Method for manufacturing a cladding of a nuclear fuel rod, said cladding having an inner layer of Zircaloy 4 which contains:

1.20% to 1.70% tin
0.18% to 0.24% iron
0.07% to 0.13% chromium, the sum of the iron and chromium contents being comprised of between 0.28% and 0.37%, and having an outer layer of a zirconium-based alloy containing by weight, besides zirconium and unavoidable impurities:

0.80% to 1.20% niobium
0.10% to 0.16% oxygen, said method comprising the steps of:

(a) providing a composite billet containing an internal layer of Zircaloy 4 and an outer blank consisting of the zirconium-niobium-oxygen alloy, by end welding;

(b) extruding said billet at about 650° C.;

(c) transforming the duplex-tube blank so obtained by a succession of thermometallurgical cycles comprising intermediary recrystallization heat treatments between rolling steps; and (d) carrying out a final recrystallization step.

9. Method according to claim 8, wherein the final recrystallization heat treatment is carried out at about 580° C.

10. Method according to claim 8, wherein the intermediary recrystallization heat treatments are carried out at about 582° C. and 700° C.

* * * * *